(12) United States Patent
Nassi et al.

(10) Patent No.: US 11,416,592 B2
(45) Date of Patent: Aug. 16, 2022

(54) METHOD FOR ONLINE SIGNATURE VERIFICATION USING WRIST-WORN DEVICES

(71) Applicants: B.G. Negev Technologies and Applications LTD., at Ben-Gurion University, Beer Sheva (IL); Ramot at Tel-Aviv University LTD., Tel Aviv (IL)

(72) Inventors: Ben Nassi, Holon (IL); Yuval Elovici, D.N. Lachish (IL); Erez Shmueli, Beer Sheva (IL); Alona Levy, Ra'anana (IL)

(73) Assignees: B.G. Negev Technologies and Applications LTD., at Ben-Gurion University, Beer Sheva (IL); Ramot at Tel-Aviv University LTD., Tel Aviv (IL)

( * ) Notice: Subject to any disclaimer, the term of this patent is extended or adjusted under 35 U.S.C. 154(b) by 44 days.

(21) Appl. No.: 16/094,709

(22) PCT Filed: Apr. 30, 2017

(86) PCT No.: PCT/IL2017/050478
§ 371 (c)(1),
(2) Date: Oct. 18, 2018

(87) PCT Pub. No.: WO2017/191626
PCT Pub. Date: Nov. 9, 2017

(65) Prior Publication Data
US 2019/0121951 A1    Apr. 25, 2019

Related U.S. Application Data

(60) Provisional application No. 62/330,160, filed on May 1, 2016.

(51) Int. Cl.
*G06F 21/32* (2013.01)
*H04L 9/40* (2022.01)
(Continued)

(52) U.S. Cl.
CPC .............. *G06F 21/32* (2013.01); *G06F 1/163* (2013.01); *G06F 21/31* (2013.01); *G06N 20/00* (2019.01);
(Continued)

(58) Field of Classification Search
CPC .......... H04L 63/0861; G06F 21/31–32; G06F 1/163; G06N 20/00–20; H04W 12/06–069
See application file for complete search history.

(56) References Cited

U.S. PATENT DOCUMENTS

| 6,587,577 B1 * | 7/2003 | Finkelstein | G06V 40/30 382/160 |
| 9,251,411 B2 * | 2/2016 | Todeschini | G06K 9/00221 |

(Continued)

FOREIGN PATENT DOCUMENTS

WO    20150162607 A1    10/2015

OTHER PUBLICATIONS

Rashidi, S., A. Fallah, and F. Towhidkhah. "Feature extraction based DCT on dynamic signature verification." Scientia Iranica 19.6 (2012): 1810-1819. (Year: 2012).*

(Continued)

*Primary Examiner* — Madhuri R Herzog
(74) *Attorney, Agent, or Firm* — Michael A. Bondi; Moss & Barnett

(57) ABSTRACT

A signature verification system, which comprises a plurality of worn devices of signing users, each provided with one or more motion sensors, and a processor for receiving motion signals from the sensors, the processor is adapted to define a set of features that describe a signature and distinguish one (Continued)

signature from another; perform a training phase by obtaining motion signals from one or more motion sensors of the worn devices; training a machine learning classifier using the instances and labels; obtain motion signals from motion sensors of the a worn device, the motion being of an allegedly genuine signature of one of the users; scale and domain transform the allegedly genuine signature; calculate values of the features describing the allegedly genuine signature with respect to scaled and transformed reference signatures of the one of the users; and apply the trained classifier on the feature values, thereby classifying the allegedly genuine signature as genuine or forged.

7 Claims, 2 Drawing Sheets

(51) Int. Cl.
    *G06F 21/31*     (2013.01)
    *G06N 20/00*     (2019.01)
    *G06F 1/16*     (2006.01)
    *H04W 12/06*     (2021.01)

(52) U.S. Cl.
    CPC ......... *H04L 63/0861* (2013.01); *H04W 12/06* (2013.01)

(56) References Cited

U.S. PATENT DOCUMENTS

| | | |
|---|---|---|
| 2005/0212751 A1 | 9/2005 | Marvit |
| 2007/0292002 A1 | 12/2007 | Kaplan |
| 2016/0034041 A1 | 2/2016 | Shin |
| 2016/0226865 A1* | 8/2016 | Chen ................. H04W 12/0608 |

OTHER PUBLICATIONS

Piekarczyk, Marcin, and Marek R. Ogiela. "On using palm and finger movements as a gesture-based biometrics." 2015 International Conference on Intelligent Networking and Collaborative Systems. IEEE, 2015. (Year: 2015).*
Bailador, Gonzalo, et al. "Analysis of pattern recognition techniques for in-air signature biometrics." Pattern Recognition 44.10-11 (2011): 2468-2478. (Year: 2011).*
Handigol, Nikhil, T. Huang, and Gene Chi Liu. "MoViSign: A novel authentication mechanism using mobile virtual signatures." (2009). (Year: 2009).*
Y. Liu, Z. Yang and L. Yang, "Online Signature Verification Based on DCT and Sparse Representation," in IEEE Transactions on Cybernetics, vol. 45, No. 11, pp. 2498-2511, Nov. 2015, doi: 10.1109/TCYB.2014.2375959. (Year: 2015).*
R. Martens and L. Claesen, "On-line signature verification by dynamic time-warping," Proceedings of 13th International Conference on Pattern Recognition, Vienna, Austria, 1996, pp. 38-42 vol. 3, doi: 10.1109/ICPR.1996.546791. (Year: 1996).*
Nanni, Loris, and Alessandra Lumini. "A novel local on-line signature verification system." Pattern Recognition Letters 29.5 (2008): 559-568. (Year: 2008).*
Faundez-Zanuy, Marcos. "On-line signature recognition based on VQ-DTW." Pattern Recognition 40.3 (2007): 981-992. (Year: 2007).*
Rashidi, Saeid, Ali Fallah, and Farzad Towhidkhah. "Similarity evaluation of online signatures based on modified dynamic time warping." Applied Artificial Intelligence 27.7 (2013): 599-617. (Year: 2013).*
Feature representation for online signature verification, Mohsen Fayyaz et al, May 29, 2015, 10 pgs.
International Search Report and Written Opinion received for PCT/IL2017/050478 dated Sep. 11, 2017, 9 pgs.

* cited by examiner

```
 1: procedure TRAIN (A set of users U A set of signatures D)
 2:     instances ← ∅
 3:     for each user u ∈ U do
 4:         G^u ← extractGenuineSignaturesOfUser (D,u)
 5:         F^u ← extractForgedSignatures (D,u)
 6:         R^u ← extractRandomSubset (G^u)
 7:         R̄^u ← G^u − R^u
 8:         R_2^u ← ∅
 9:         for each signature r ∈ R do
10:             r_1 ← scale (r)
11:             r_2 ← DCT (r_1)
12:             R_2^u ← R_2^u ∪ {r_2}
13:         for each signature s ∈ R̄^u ∪ F^u do
14:             s_1 ← scale (s)
15:             s_2 ← DCT (s_1)
16:             (f_1, f_2 ... f_n) ← extractFeatures (R_2^u, s_2)
17:             if s ∈ R̄^u then
18:                 label ← 'Genuine'
19:             else
20:                 label ← 'Forged'
21:             instance ← (f_1, f_2, ... f_n, label)
22:             instances ← instances ∪ instance
23:     C ← trainClassifier (instances)
24:     return C
```

FIG. 3

```
1:  procedure Verify(classifier C, identity u,
    questioned-signature q)
2:      R_2^u ← extractReferenceSignatures(u)
3:      q_1 ← scale(u)
4:      q_2 ← DCT(q_1)
5:      (f_1,...,f_n) ← extractFeatures (R_2^u, q_2)
6:      return classify (C,(f_1,...,f_n))
```

FIG. 4

METHOD FOR ONLINE SIGNATURE VERIFICATION USING WRIST-WORN DEVICES

FIELD OF THE INVENTION

The present invention relates to the field of handwritten signature verification. More particularly, the invention relates to a method for verifying handwritten signatures online using wrist-worn devices.

BACKGROUND OF THE INVENTION

Financial fraud is a common occurrence across the globe, causing a significant amount of damage to the global economy. According to a recent survey, around 37.8 million incidents of fraud took place in 2011 in the US, resulting in a loss of around $40 to $50 billion. Despite prevention efforts of banks, businesses and the law enforcement community, paper checks continue to lead as the payment type most susceptible to fraud and as the payment method accounting for the largest dollar amount of loss due to fraud (1.2 Billion dollars in 2011 alone).

Paper checks, as well as other legal, financial and administrative documents, commonly rely on handwritten signature verification systems to protect against fraud. In a typical handwritten signature verification system, a user claims to be a particular individual, and provides a signature sample thereof. The role of the verification system is to determine, based on the signature sample, whether the user is indeed who he is claimed to be.

Signature verification systems can be classified into two approaches: the offline approach that relies on the static handwriting image and the online approach that relies on the dynamic trajectory of the pen tip. While the latter approach usually requires a designated ad-hoc device (commonly called a digitizer), the additional time dimension provides valuable information about the signature, therefore leading to a higher verification performance, in general.

More specifically, signature verification systems aim to automatically classify query signatures as genuine (i.e. confirm that they were signed by the claimed user) or forged. FIG. 1 (prior art) schematically illustrates the two-phase process of signature verification. Such processes usually consist of an enrollment phase 100, during which a system's user 101 provides samples of his/her signature, features 102 are extracted therefrom and a set of reference signatures 103 is determined. The system further comprises an operation (or classification) phase 104, in which a user 105 claims the identity of a person and provides a query signature, the features 106 of which are extracted and compared to a model 107 of the reference signatures 103 in order to determine whether the query signature of user 105 is genuine 108 or a forgery 109. One of the main reasons for the widespread use of such systems is that the process of collecting handwritten signatures is non-invasive and familiar, given that people routinely use signatures in their daily life.

Depending on the data acquisition type, signature verification systems can be classified as online (dynamic) or offline (static) verification. Traditional signature verification systems are based on the offline handwriting image. In this case, signatures are represented as digital images, usually in grayscale format, comprising of a set of points (x,y); $0 \leq x \leq H$; $0 \leq y \leq W$, where H and W denote the height and width of the image.

In contrast, online signature verification systems take the dynamic writing process into account. Signatures are represented by a pen tip trajectory measurement that captures the position of a pen over time; depending on the digitizer, this may be accompanied by additional measurements of the pressure and pen inclination. In this case, the signatures are represented as a sequence (n); n=1, ..., N, where S(n) is the signal sampled at time $n \cdot \Delta t$ and $\Delta t$ is the sampling interval. Clearly, the additional time dimension captured by online systems provides valuable information about the signature, thereby leading to a higher level of verification performance.

A feature-based online signature verification approach represents signatures as feature vectors. Dynamic Time Warping (DTW an algorithm for measuring similarity between two temporal sequences which may vary in speed) matches signatures directly with reference samples of the claimed user and is particularly useful if only a few reference signatures are available, which is a typical scenario. More specifically, DTW computes a dissimilarity score between two time sequences. Taking into account the (possibly different) lengths of the two sequences, the sequences are aligned along a common time axis such that the sum of Euclidean distances between the feature vectors along the warping path is minimal. With regard to signatures, DTW matches two signatures by aligning the pen-tip trajectory measurements along a common time axis. The resulting distance depends on the sequence length of the two signatures and needs to be compared with a threshold, in order to accept or reject the claimed identity.

In contrast, a function-based online signature verification approach takes complete time sequences into account. This approach is known to provide a data security advantage, since the original signature no longer has to be stored in the database. However, it was recently showed that homomorphic encryption (a method which preserves certain mathematical operations when transferring from plaintext to ciphertext and vice versa) can be easily applied to function-based methods such as Dynamic Time Warping, thereby offering a security element to the function-based approach without compromising its accuracy. Therefore, the feature-based approach is considered as having a prominent security advantage over the function-based approach is no longer warranted.

Several variations of the function-based approach use a Discrete Cosine Transform (DCT—a transform that expresses a finite sequence of data points in terms of a sum of cosine functions oscillating at different frequencies) compression of the signal instead of using its raw form. While mainly used in the field of speech recognition, the effect of using DCT has been found to be significant in signature verification systems.

A variety of works suggested the use of wearable devices for the tasks of user authentication and gesture recognition. Most of these works rely on the motion sensors (typically accelerometer and gyroscope) embedded in the devices to detect and understand unique movements of the person wearing the device.

Wrist-worn devices, such as smartwatches and fitness trackers, have become a popular category of wearable devices, and many major manufacturers, including Samsung® and Apple®, have released their devices. Since these devices are worn on the wrist, they introduce a unique opportunity to both detect and understand a user's arm, hand and finger movements. However, this is limited to the gestures of a specific finger, and gestures using other fingers cannot be identified. Wrist-worn devices are less limited as they facilitate gesture recognition based on the arm, the hand and all of the fingers.

While there has been a lot of research and development in the field of user authentication using smartphone devices, there have been only a few results that aimed to authenticate users using wearable devices.

US 2016/0034041A1 discloses a method is suggested by which the veins of a smartwatch user are used to authenticate his/her identity. In the field of handwriting analysis, several recent approaches have tried to use motion data collected from wearable devices to recognize different writing gestures such as inferring the letter written. However none of the existing approaches have addressed the task of handwritten signature verification using motion data collected from wearable devices in general and wrist-worn devices in particular.

It is therefore an object of the present invention to provide a verification system that combines the function-based and feature-based approaches.

It is another object of the invention to provide a system that uses a single classification model that is trained only once using a relatively small set of genuine and forged signatures.

It is yet another object of the invention to provide a system for verifying handwritten signatures using motion data collected from a wrist-worn device.

Other objects and advantages of this invention will become apparent as the description proceeds.

SUMMARY OF THE INVENTION

The present invention is directed to a method for online signature verification using worn devices (preferably wrist-worn devices), comprising the following steps:
a) defining a set of features that describe a signature and distinguish one signature from another;
b) performing a training phase by:
  i. obtaining motion signals from one or more motion sensors of the worn devices, the motion being of users demonstrating a set of reference signatures and another set of forged and genuine signatures;
  ii. scaling and domain transforming each of the reference signatures;
  iii. scaling and domain transforming each of the forged and genuine signatures;
  iv. creating instances containing values of the features describing the scaled and transformed set of forged and genuine signatures with respect to the scaled and transformed reference signatures;
  v. assigning a genuinity label to each of the instances;
  vi. training a machine learning classifier using the instances and labels;
c) obtaining motion signals from motion sensors of the a worn device, the motion being of an allegedly genuine signature of one of the users;
d) scaling and domain transforming the allegedly genuine signature;
e) calculating values of the features describing the allegedly genuine signature with respect to scaled and transformed reference signatures of the one of the users; and
f) applying the trained classifier on the feature values, thereby classifying the allegedly genuine signature as genuine or forged.

The predefined set of features may comprise nine features that together describe a signature and distinguish one signature from another and describe the relation to other signatures.

The scaling may comprise computing Euclidean distances by means of Dynamic Time Warping (DTW).

The domain transforming may comprise a Discrete Cosine Transformation (DCT).

The one or more motion sensors may be provided in the worn devices and may be selected from the group of;
  accelerometers;
  gyroscopes.

In one aspect, the features are extracted by the following steps:
a) receiving as an input a dataset D of genuine and forged signatures belonging to a set of users U;
b) extracting for each user $u \in U$, a set $G^u$ of genuine signatures and a set signatures $F^u$ of forged signatures;
c) randomly selecting From the set of genuine signatures $G^u$ of user u, a subset of genuine signatures to serve as user u's reference signatures $R^u$, where $\overline{R^u}$ is remaining genuine signatures in $G^u - R^u$;
d) applying scaling and domain transformation to each reference signatures $r \in R^u$ thereby obtaining a resulting set of scaled reference signatures $R_2^u$. For each signature s in $\overline{R^u} \cup F^u$:
e) applying scaling and domain transformation to s, thereby creating a scaled and transformed signature $s_2$
f) extracting a predefined set of features $(f_1, \ldots, f_n)$ from $s_2$ and the set of scaled and transformed reference signatures $R_2^u$.

In one aspect, a questioned signature q is verified by:
a) retrieving the set of scaled and transformed reference signatures $R_2^u$ for the claimed user u from the system's database;
b) scaling and domain transforming the new allegedly genuine signature q calculating the values of the features $(f_1, \ldots, f_n)$, based on the scaled and domain-transformed question signature q and the set of reference signatures $R_2^u$;
c) applying a trained classifier C on the set of features $(f_1, \ldots, f_n)$ to determine whether or not q is a genuine, or forged signature.

The present invention is also directed to a signature verification system, which comprises:
a) a plurality of worn devices of signing users (preferably wrist-worn devices), each provided with one or more motion sensors;
b) a processor being capable of receiving motion signals from the sensors, the processor is adapted to:
c) define a set of features that describe a signature and distinguish one signature from another;
d) perform a training phase by:
  vii. obtaining motion signals from one or more motion sensors of the worn devices, the motion being of users demonstrating a set of reference signatures and another set of forged and genuine signatures;
  viii. scaling and domain transforming each of the reference signatures;
  ix. scaling and domain transforming each of the forged and genuine signatures;
  x. creating instances containing values of the features describing the scaled and transformed set of forged and genuine signatures with respect to the scaled and transformed reference signatures;
  xi. assigning a genuinity label to each of the instances;
  xii. training a machine learning classifier using the instances and labels;

e) obtain motion signals from motion sensors of the a worn device, the motion being of an allegedly genuine signature of one of the users;
f) scale and domain transform the allegedly genuine signature;
g) calculate values of the features describing the allegedly genuine signature with respect to scaled and transformed reference signatures of the one of the users; and
h) apply the trained classifier on the feature values, thereby classifying the allegedly genuine signature as genuine or forged.

BRIEF DESCRIPTION OF THE DRAWINGS

In the drawings:
FIG. 3 shows an algorithm outlining stages of the training phase according to an embodiment of the invention;
and
FIG. 4 shows an algorithm outlining stages of verifying a signature according to an embodiment of the invention.

DETAILED DESCRIPTION OF THE INVENTION

The present invention refers to a method and system for online signature verification using wrist-worn devices. The term "online" used herein refers to a process which takes place at the same time as another process, in contrast to an "offline" process that takes place only when another process ends.

Handwritten signatures are verified by analyzing motion data (that may be obtained for example, from accelerometer and gyroscope measurements) obtained from motion sensors (such as accelerometers and gyroscopes) of wrist-worn devices. The verification process comprises two phases: a training phase and an operation phase.

Figure 1:
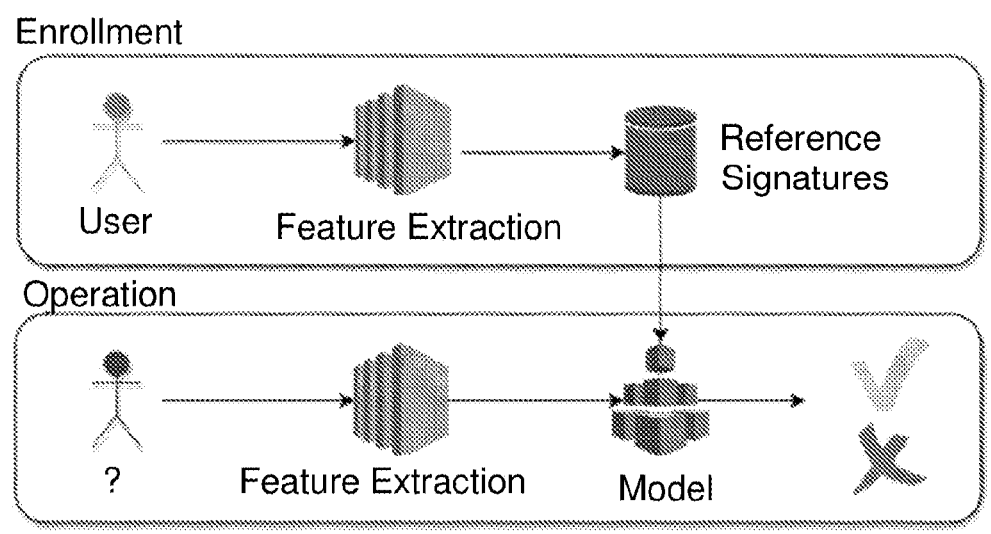
FIG. 1 (prior art) schematically illustrates the two phase process of signature verification.
Figure 2:
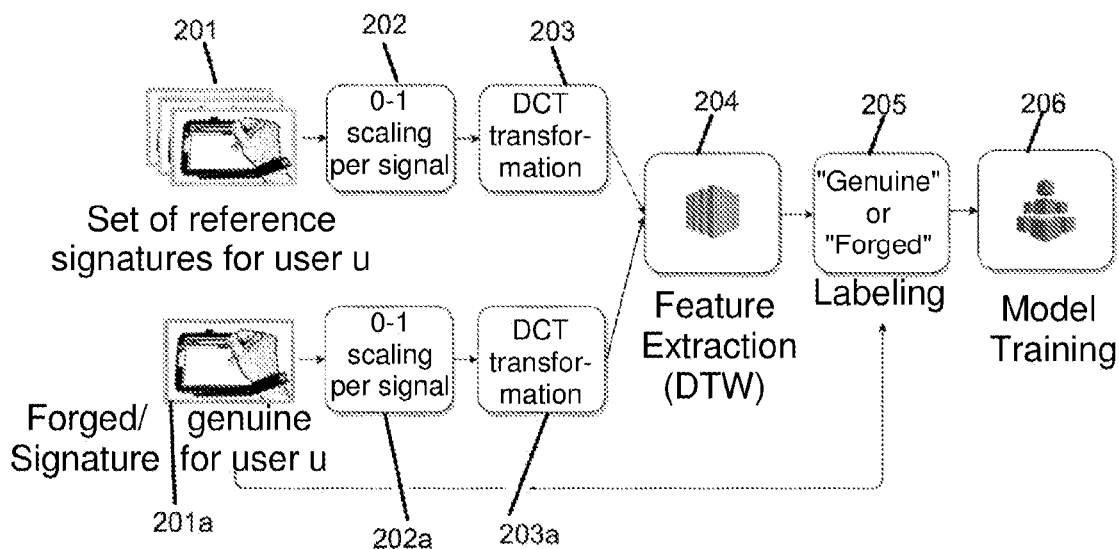
FIG. 2 schematically illustrates the process of the training phase according to an embodiment of the invention.

FIG. 2 illustrates the process of the training phase according to an embodiment of the invention. At the first stages, 201 and 201a, demonstrated sets of reference and forged/genuine (respectively) signatures are obtained from the motion sensors of the wrist-worn devices. At the next stages, 202 and 202a, the sets of signatures are scaled. At the next stages, 203 and 203a, the scaled signatures go through a process of domain transformation. At the next stage 204, the values of a predetermined set of features are extracted from the transformed scaled signatures. At the next stage 205 the values are labeled according to the original signature to which they belong (either a genuine or a forged signature). At the next and last stage 206, a model is created, which capable of receiving as input an unknown signature and detecting whether it is genuine or forged according to the signature's values of the predetermined features.

FIG. 3 shows an algorithm outlining the stages of the training phase according to an embodiment of the invention. The algorithm receives as an input a dataset D of genuine and forged signatures belonging to a set of users U (line 1). For each user $u \in U$ (line 3), a set of user u's genuine signatures is extracted, denoted as $G^u$, in addition to a set of forged signatures of the user's (forging attempts of the user's genuine signatures by others), denoted as $F^u$ (lines 4-5). From the set of genuine signatures $G^u$ of user u, a subset of genuine signatures is randomly selected to serve as user u's reference signatures, denoted by $R^u$ (line 6). The remaining genuine signatures in $G^u - R^u$ are denoted as $\overline{R^u}$ (line 7). Each one of the reference signatures $r \in R^u$ goes through a process of scaling and domain transformation (lines 8-12), as will be further explained in detail hereinafter. The resulting set of reference signatures is denoted as $R_2^u$. For each signature s in $\overline{R^u} \cup F^u$ (line 13), the following stages are applied: First, s goes through a process of scaling and domain transformation (lines 14-15). Next, given the scaled and transformed signature $s_2$ and the set of scaled and transformed reference signatures $R_2^u$, values of a predefined set of features $(f_1, \ldots, f_n)$ are extracted therefrom (line 16). According to an embodiment of the invention, the predefined set of features comprises nine features that together describe a signature and distinguish one signature from another and describe the relation to other signatures, according to the values thereof. For instance, the similarity value of the x axis of the accelerometer can be calculated as the first feature by applying the DTW function on the signal of the x axis of the accelerometer from $R_2^u$ and on the signal of the x axis of the accelerometer from $s_2$. An instance, containing the extracted feature values, is then assigned with a genuinity label, according to whether the signature is genuine or forged (lines 17-21), and added to the set of all instances (line 22). Finally, the resulting set of instances is used to train a machine learning classifier (line 23).

The scaling, transformation and feature extraction processes of lines 14, 15 and 16, respectively, and as shown in the training process in FIG. 2 is now described in more detail.

According to an embodiment of the invention, Euclidean distance computations are made by means of Dynamic Time Warping (DTW). Each of the motion signals is first scaled to a 0-1 basis. The scaled value of each motion signal can be calculated according to a feature scaling rescaling method. More formally, denoting the $j^{th}$ motion signal as $s_j$ and its $k^{th}$ value as $s_{jk}$, then its scaled value $\hat{s}_{jk}$ is computed according to Eq. 1 below, which is referred to as the rescaling method (described for example in https://en.wikipedia.org/wiki/Feature_scaling):

$$\hat{s}_{jk} = \frac{s_{jk} - \min(s_j)}{\max(s_j) - \min(s_j)} \qquad \text{Eq. 1}$$

Once the motion signals are scaled, they each go through a Discrete Cosine Transform (DCT) transformation, as is known to the skilled person, and as is demonstrated, for example, in https://en.wikipedia.org/wiki/Discrete_cosine_transform, in order to extract the most significant coefficients.

The first DCT coefficients are known to retain most of the energy (and therefore most of the information) of the signal compared to the latter ones which correspond to higher, and therefore usually noisier, frequencies. The first 20 DCT coefficients of each signal are used. Following this transformation, all signatures are represented by the transformed (and compressed) motion signals rather than by the original (which are longer and more computationally burdensome) signals.

Recalling that the set of genuine signatures $G^u$ of user u was divided into $R^u$ and $\overline{R^u}$. The signatures in $\overline{R^u}$ and $F^u$ are treated as questioned signatures for training purposes. This means that each questioned signature q will be compared against the set of reference signatures $R^u$, by means of DTW, in order to generate a feature vector.

More formally, given a questioned signature $q \in R^u \cup F^u$ and the set of reference signatures $r_i \in R^u$ the following is denoted:

- $q_c$ is the scaled and DCT-transformed motion signal c of a questioned signature q.
- $r_{ic}$ is the scaled and DCT-transformed motion signal c of a reference signature $r_i \in R^u$.
- $R_c^u$ represents the set of scaled and DCT-transformed motion signals c extracted from each of the reference signatures, i.e. $R_c^u = \{r_{1c}, r_{2c}, \ldots, r_{Kc}\}$, where $K = |R^u|$.

For each questioned signature q's transformed signals $q_c$, the minimal DTW score is computed when compared against the corresponding set of N reference signals $R_c^u$ according to Eq. 3:

$$D_{min}(R_c^u, q_c) = \min_{i=1,\ldots,K} D(r_{ic}, q_c) \quad \text{Eq. 3}$$

The meaning of this is that each questioned signature q is represented by a vector $\vec{d}_q^u$ of DTW scores, where each element represents the score above computed for a specific signal c where $c = 1, \ldots, N$:

$$\vec{d}_q^u = \begin{pmatrix} D_{min}(R_1^u, q_1) \\ D_{min}(R_2^u, q_2) \\ \vdots \\ D_{min}(R_N^u, q_n) \end{pmatrix} \quad \text{Eq. 4}$$

This vector of DTW features is created for each one of the questioned signatures collected for user u. This means that each of the questioned signatures $q \in R^u \cup F^u$ contribute one such feature vector to the final feature matrix. The intermediate matrix that results from performing this procedure on one user would consist of $Q = |R^u \cup F^u|$ rows as follows:

$$I^u = \begin{bmatrix} \vec{d}_1^u \\ \vec{d}_2^u \\ \vdots \\ \vec{d}_Q^u \end{bmatrix} \quad \text{Eq. 5}$$

The above process is repeated for all users $u \in U$, each with a new set of reference signatures $R^u$ and forgery signatures $F^u$, until a full feature matrix, consisting of all intermediate matrices $I^u$, is generated:

$$M = \begin{bmatrix} I^1 \\ I^2 \\ \vdots \\ I^{|U|} \end{bmatrix} \quad \text{Eq. 6}$$

Following the scaling, domain transformation and feature extraction processes defined above, each of the questioned signatures is labeled either "Genuine" or "Forged" using their true class and a classifier/model is trained over all questioned signatures, as is shown in stages 205 and 206 in FIG. 2.

After creating a model/classifier, i.e. after completing the training phase, every new (unknown) user u that would like to use the proposed system, has to enroll first by providing the user's identity and a set of genuine reference signatures $R^u$. The signatures in $R^u$ go through a process of scaling and domain transformation, and the resulting set of scaled and transformed signatures, denoted as $R_2^u$ is stored in the system's database. This is similar to the process of opening a new bank account, where the owner is requested to supply a few signature samples to enable the bank to verify the user's identity in the future. This phase is performed only once per user. It is important to note that the model described hereinabove does not change upon new enrollment to the system and does not require re-training.

FIG. 4 shows an algorithm outlining the stages of verifying a signature according to an embodiment of the invention. Given a new questioned (allegedly genuine) signature q, an identity of an enrolled user u to which q claims to belong, and a trained classifier, C, the verification algorithm works as follows: First, the set of scaled and transformed reference signatures $R_2^u$ for the claimed user u is retrieved from the system's database (line 2). Next the new allegedly genuine signature q is scaled (line 3) and domain transformed (line 4). Then, the values of the features $(f_1, \ldots, f_n)$ is calculated based on the scaled and domain-transformed question signature q and the set of reference signatures $R_2^u$ (line 5), as described hereinabove. Finally, the trained classifier C is applied on the set of features $(f_1, \ldots, f_n)$ to determine whether or not q is a genuine or forged signature (line 6).

It is important to note that, as seen in line 6 of FIG. 4, the same global classifier is used for all claimed identities. The only thing that differs between identities is the set of reference signatures $R_2^u$ that is used to generate the set of features $(f_1, \ldots, f_n)$.

Although embodiments of the invention have been described by way of illustration, it will be understood that the invention may be carried out with many variations, modifications, and adaptations, without exceeding the scope of the claims.

The invention claimed is:

1. A method for online signature verification using worn devices, comprising:
   a) defining a set of features that describe a signature and distinguish one signature from another;
   b) performing a training phase by:
      i. obtaining motion signals from one or more motion sensors of said worn devices, the motion being of a user u of a plurality of users U demonstrating a set of reference signatures ($R^U$) and another set of forged and genuine signatures ($\overline{R^U \cup F^U}$);
      ii. scaling and domain transforming each of said reference signatures $R^U$;
      iii. scaling and domain transforming each of said forged and genuine signatures $\overline{R^U \cup F^U}$;
      iv. creating instances containing values of said features describing said scaled and transformed set of forged and genuine signatures with respect to said scaled and transformed reference signatures, wherein creating the instances comprises: for each questioned signature $q \in \overline{R^U \cup F^U}$ collected for one user u, creating a vector comprising of minimal DTW scores that are computed when a scaled and transformed q is compared against the set of reference signals $R^U$, thereby generating an intermediate matrix $I^u$ that consists of $Q = |\overline{R^U \cup F^U}|$ rows and corresponds to said one user u;
      v. repeating steps i)-iv) above for all users $u \in U$, each with a new set of reference signatures $R^u$ and a set of forged and genuine signatures ($\overline{R^U \cup F^U}$), to generate a final feature matrix consisting of all intermediate matrices $I^1, \ldots, I^u$;

vi. assigning a genuinity label to each of the questioned signatures;

vii. training a machine learning classifier using the final feature matrix of the questioned signatures and labels;

c) obtaining motion signals from motion sensors of said worn device, the motion being of an allegedly genuine signature of one of said users;

d) scaling and domain transforming said allegedly genuine signature by computing Euclidean distances using Dynamic Time Warping (DTW);

e) calculating values of said features describing said allegedly genuine signature with respect to scaled and transformed reference signatures of said one of said users; and f) applying the trained classifier on the values calculated in e), thereby classifying said allegedly genuine signature as genuine or forged.

2. A method according to claim 1, wherein the set of features comprises nine features that together describe a signature and distinguish one signature from another and describe relation to other signatures.

3. A method according to claim 1, wherein the domain transforming comprises a Discrete Cosine Transformation (DCT).

4. A method according to claim 1, wherein the one or more motion sensors are provided in the worn devices and are selected from the group of:
   accelerometers;
   gyroscopes.

5. A method according to claim 1, wherein the features are extracted by the following steps:
   a) receiving as an input a dataset D of genuine and forged signatures belonging to a set of users U;
   b) extracting for each user $u \in U$, a set $G^u$ of genuine signatures and a set signatures $F^u$ of forged signatures;
   c) randomly selecting from the set of genuine signatures $G^u$ of user u, a subset of genuine signatures to serve as user u's reference signatures $R^u$, where $\overline{R^u}$ is remaining genuine signatures in $G^u - R^u$;
   d) applying scaling and domain transformation to each reference signatures $r \in R^u$ thereby obtaining a resulting set of scaled reference signatures $R_2^u$, For each signature s in $\overline{R^u} \cup F^u$:
   e) applying scaling and domain transformation to s, thereby creating a scaled and transformed signature $s_2$
   f) extracting a predefined set of features $(f_1, \ldots, f_n)$ from $s_2$ and the set of scaled and transformed reference signatures $R_2^u$.

6. A method according to claim 5, wherein a questioned signature q is verified by:
   a) retrieving the set of scaled and transformed reference signatures $R_2^u$ for a claimed user u from a system's database;
   b) scaling and domain transforming a new allegedly genuine signature q calculating the values of the features $(f_1, \ldots, f_n)$, based on the scaled and domain-transformed question signature q and the set of reference signatures $R_2^u$;
   c) applying a trained classifier C on the set of features $(f_1, \ldots, f_n)$ to determine whether or not q is a genuine, or forged signature.

7. A signature verification system, comprising:
a) a plurality of worn devices of signing users, each provided with one or more motion sensors;
b) a processor being capable of receiving motion signals from said sensors, said processor is adapted to:
c) define a set of features that describe a signature and distinguish one signature from another;
d) perform a training phase by:
i. obtaining motion signals from one or more motion sensors of said worn devices, the motion being of a user u of a plurality of users U demonstrating a set of reference signatures ($R^U$) and another set of forged and genuine signatures ($\overline{R^U} \cup F^U$);
ii. scaling and domain transforming each of said reference signatures $R^U$;
iii. scaling and domain transforming each of said forged and genuine signatures $\overline{R^U} \cup F^U$;
iv. creating instances containing values of said features describing said scaled and transformed set of forged and genuine signatures with respect to said scaled and transformed reference signatures, wherein creating the instances comprises: for each questioned signature $q \in \overline{R^U} \cup F^U$ collected for one user u, creating a vector comprising of minimal DTW scores that are computed when a scaled and transformed q is compared against the set of reference signals $R^U$, thereby generating an intermediate matrix $I^u$ that consists of $Q = |\overline{R^U} \cup F^U|$ rows and corresponds to said one user u;
v. repeating steps i)-iv) above for all users $u \in U$, each with a new set of reference signatures $R^u$ and a set of forged and genuine signatures ($\overline{R^U} \cup F^U$), to generate a final feature matrix consisting of all intermediate matrices $I^1, \ldots, I^u$;
vi. assigning a genuinity label to each of the questioned signatures;
vii. training a machine learning classifier using the final feature matrix of the questioned signatures and labels;
e) obtain motion signals from motion sensors of said worn device, the motion being of an allegedly genuine signature of one of said users;
f) scale and domain transforming said allegedly genuine signature by computing Euclidean distances using Dynamic Time Warping (DTW);
g) calculating values of said features describing said allegedly genuine signature with respect to scaled and transformed reference signatures of said one of said users; and
h) apply the trained classifier on the values calculated in g), thereby classifying said allegedly genuine signature as genuine or forged.

* * * * *